US010223045B2

(12) United States Patent
Saito

(10) Patent No.: US 10,223,045 B2
(45) Date of Patent: Mar. 5, 2019

(54) MANAGEMENT SERVER COMMUNICATING WITH IMAGE PROCESSING APPARATUS AND TERMINAL DEVICE

(71) Applicant: BROTHER KOGYO KABUSHIKI KAISHA, Nagoya, Aichi (JP)

(72) Inventor: Ken Saito, Tokoname (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/716,814

(22) Filed: Sep. 27, 2017

(65) Prior Publication Data

US 2018/0181352 A1 Jun. 28, 2018

(30) Foreign Application Priority Data

Dec. 28, 2016 (JP) .................................. 2016-256036

(51) Int. Cl.
*G06K 15/00* (2006.01)
*G06F 3/12* (2006.01)

(52) U.S. Cl.
CPC .......... *G06F 3/1228* (2013.01); *G06F 3/1205* (2013.01); *G06F 3/1222* (2013.01);
(Continued)

(58) Field of Classification Search
CPC .... G06F 3/1205; G06F 3/1222; G06F 3/1231; G06F 3/1238; G06F 3/1288
See application file for complete search history.

(56) References Cited

U.S. PATENT DOCUMENTS 6,970,263 B2 11/2005 Suzuki et al.
9,451,432 B2 9/2016 Arai
(Continued)

FOREIGN PATENT DOCUMENTS

JP 2002-032205 A 1/2002
JP 2010-0309503 A1 12/2010
(Continued)

OTHER PUBLICATIONS

U.S. Appl. No. 15/912,787, filed Mar. 6, 2018.
(Continued)

*Primary Examiner* — Moustapha Diaby
(74) *Attorney, Agent, or Firm* — Scully, Scott, Murphy & Presser, PC

(57) ABSTRACT

A management server receives a location information request from an image processing apparatus. The location information request is for requesting location information of the management server. The location information is for allowing a terminal device to transmit original image data to the management server. The management server transmits the location information to the image processing apparatus as a response to the location information request. The management server receives the original image data which is transmitted from the terminal device by using the location data. The management server stores the received original image data. The management server transmits identification information identifying the original image data to the terminal device. The management server receives specific information which enables specification of the identification information from the image processing apparatus. The management server transmits target image data based on the original image data identified by the identification information specified by the specific information.

10 Claims, 10 Drawing Sheets

(52) U.S. Cl.
CPC .......... *G06F 3/1231* (2013.01); *G06F 3/1232* (2013.01); *G06F 3/1238* (2013.01); *G06F 3/1288* (2013.01)

(56) References Cited

U.S. PATENT DOCUMENTS

| | | | |
|---|---|---|---|
| 2005/0270569 A1* | 12/2005 | Hayashi | H04N 1/00204 358/1.15 |
| 2007/0229891 A1* | 10/2007 | Yanagi | H04L 67/18 358/1.15 |
| 2008/0033955 A1 | 2/2008 | Fujii | |
| 2010/0309503 A1 | 12/2010 | Partridge et al. | |
| 2012/0026536 A1* | 2/2012 | Shah | G06F 3/1206 358/1.15 |
| 2012/0110065 A1* | 5/2012 | Oshima | G06F 3/1204 709/203 |
| 2013/0086638 A1 | 4/2013 | Itogawa et al. | |
| 2014/0132981 A1* | 5/2014 | Song | G06F 3/1203 358/1.15 |
| 2017/0126926 A1 | 5/2017 | Saito | |

FOREIGN PATENT DOCUMENTS

| | | |
|---|---|---|
| JP | 2013-080300 A | 5/2013 |
| JP | 2013-156952 A | 8/2013 |
| JP | 2017-084217 A | 5/2017 |

OTHER PUBLICATIONS

U.S. Appl. No. 15/336,175, filed Oct. 27, 2016.
Notice of Allowance dated Mar. 16, 2018 from related U.S. Appl. No. 15/336,175.

* cited by examiner

FIG. 11
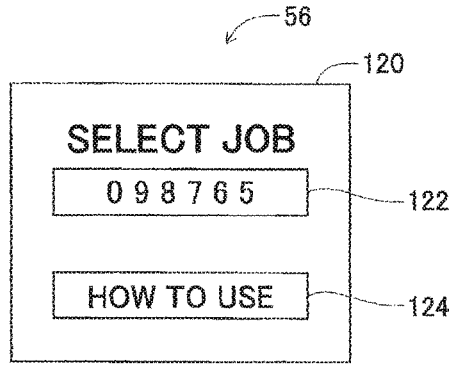
FIG. 12
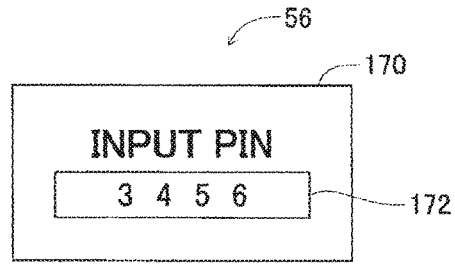
FIG. 13
MODEL INFORMATION
| MODEL NAME | PRINTABLE FILE FORMAT | PRINTABLE SETTINGS |
|---|---|---|
| mn-1 | JPEG, PDF | DUPLEX PRINT: POSSIBLE, SHEET SIZE: A3, A4, AND LETTER |
| mn-2 | JPEG, PDF | DUPLEX PRINT: IMPOSSIBLE SHEET SIZE: A4 AND LETTER |
FIG. 14
REGISTERED DEVICE INFORMATION
| UNIQUE INFO | DEVICE ID | MODEL NAME |
|---|---|---|
| 112233 | 123456 | mn-1 |
| 332211 | 123457 | mn-1 |
| 223311 | 123458 | mn-2 |

FIG. 15

JOB INFORMATION

| DEVICE ID | JOB ID | FILE ID | FILE FORMAT | PIN CODE | NUMBER OF ERRORS | REGISTERED DATE AND TIME | PRINTING INFORMATION |
|---|---|---|---|---|---|---|---|
| 123456 | 098765 | XXXXX | PDF | 3456 | 0 | 2016/11/24 15:20 | 2 COPIES, DUPLEX PRINTING, A3 SIZE |
| 123457 | 098766 | YYYYY | JPEG | 4567 | 1 | 2016/11/26 17:35 | 1 COPY, DUPLEX PRINTING, A4 SIZE |
| 123458 | 098767 | ZZZZZ | Word | 5678 | 0 | 2016/11/27 10:15 | 1 COPY, SIMPLEX PRINTING, LETTER |

MANAGEMENT SERVER COMMUNICATING WITH IMAGE PROCESSING APPARATUS AND TERMINAL DEVICE

CROSS REFERENCE TO RELATED APPLICATION

This application claims priority from Japanese Patent Application No. 2016-256036 filed Dec. 28, 2016. The entire content of the priority application is incorporated herein by reference.

TECHNICAL FIELD

The present disclosure relates to a management server capable of communicating with both an image processing apparatus and a terminal device.

BACKGROUND

As described in Japanese Patent Application Publication No. 2013-156952, a device driver for the image processing apparatus must be installed on the terminal device in order to control the image processing apparatus to print an image based on image data stored on the terminal device.

SUMMARY

It is an object of the present disclosure to provide a technique for controlling an image processing apparatus to print an image based on image data stored on a terminal device without requiring the user of the terminal device to install a device driver for the image processing apparatus on the terminal device.

In order to attain the above and other objects, the disclosure provides, the disclosure provides a management server. The management server includes a communication interface, a processor, and a memory. The communication interface is configured to communicate with an image processing apparatus and a terminal device. The memory storing computer-readable instructions therein. The computer-readable instructions, when executed by the processor, cause the management server to perform: receiving a location information request from the image processing apparatus, the location information request being for requesting location information of the management server, the location information being for allowing the terminal device to transmit original image data to the management server; transmitting the location information to the image processing apparatus as a response to the location information request; receiving the original image data which is transmitted from the terminal device after the terminal device accesses the management server by using the location information which is acquired from the image processing apparatus; storing the received original image data; transmitting identification information identifying the original image data to the terminal device; receiving specific information which enables specification of the identification information from the image processing apparatus; and transmitting target image data based on the original image data identified by the identification information which is specified by the specific information.

According to another aspects, the disclosure provides an image processing apparatus. The image processing apparatus includes a communication interface, a processor, and a memory. The communication interface is configured to communicate with a terminal device. The memory stores computer-readable instructions therein. The computer-readable instructions, when executed by the processor, cause the management server to perform: receiving a location information request, the location information request being for requesting location information of the image processing apparatus, the location information being for allowing the terminal device to transmit original image data to the image processing apparatus; outputting the location information as a response to the location information request; receiving the original image data which is transmitted from the terminal device after the terminal device accesses the image processing apparatus by using the location data which is acquired from the image processing apparatus; storing the received original image data; transmitting identification information identifying the original image data to the terminal device; receiving specific information which enables specification of the identification information; and performing an image process on target image data based on the original image data identified by the identification information which is specified by the specific information.

According to still another aspects, the disclosure provides a method. The method includes: receiving a location information request, the location information request being for requesting location information of an apparatus, the location information being for allowing a terminal device to transmit original image data to the management server; outputting the location information as a response to the location information request; receiving the original image data which is transmitted from the terminal device after the terminal device accesses the apparatus by using the location data; receiving the original image data which is transmitted from the terminal device by using the location data; storing the received original image data; transmitting identification information identifying the original image data to the terminal device; receiving specific information which enables specification of the identification information; and transmitting target image data based on the original image data identified by the identification information which is specified by the specific information.

BRIEF DESCRIPTION OF THE DRAWINGS

The particular features and advantages of the disclosure as well as other objects will become apparent from the following description taken in connection with the accompanying drawings, in which:

FIG. 11 is an explanation diagram illustrating a job list screen according to the embodiment;

FIG. 12 is an explanation diagram illustrating a PIN code input screen according to the embodiment;

FIG. 13 is an explanation diagram illustrating model information according to the embodiment;

FIG. 14 is an explanation diagram illustrating registered device information according to the embodiment; and FIG. 15 is an explanation diagram illustrating job information according to the embodiment.

DETAILED DESCRIPTION

Structure of a Communication System

Figure 1:
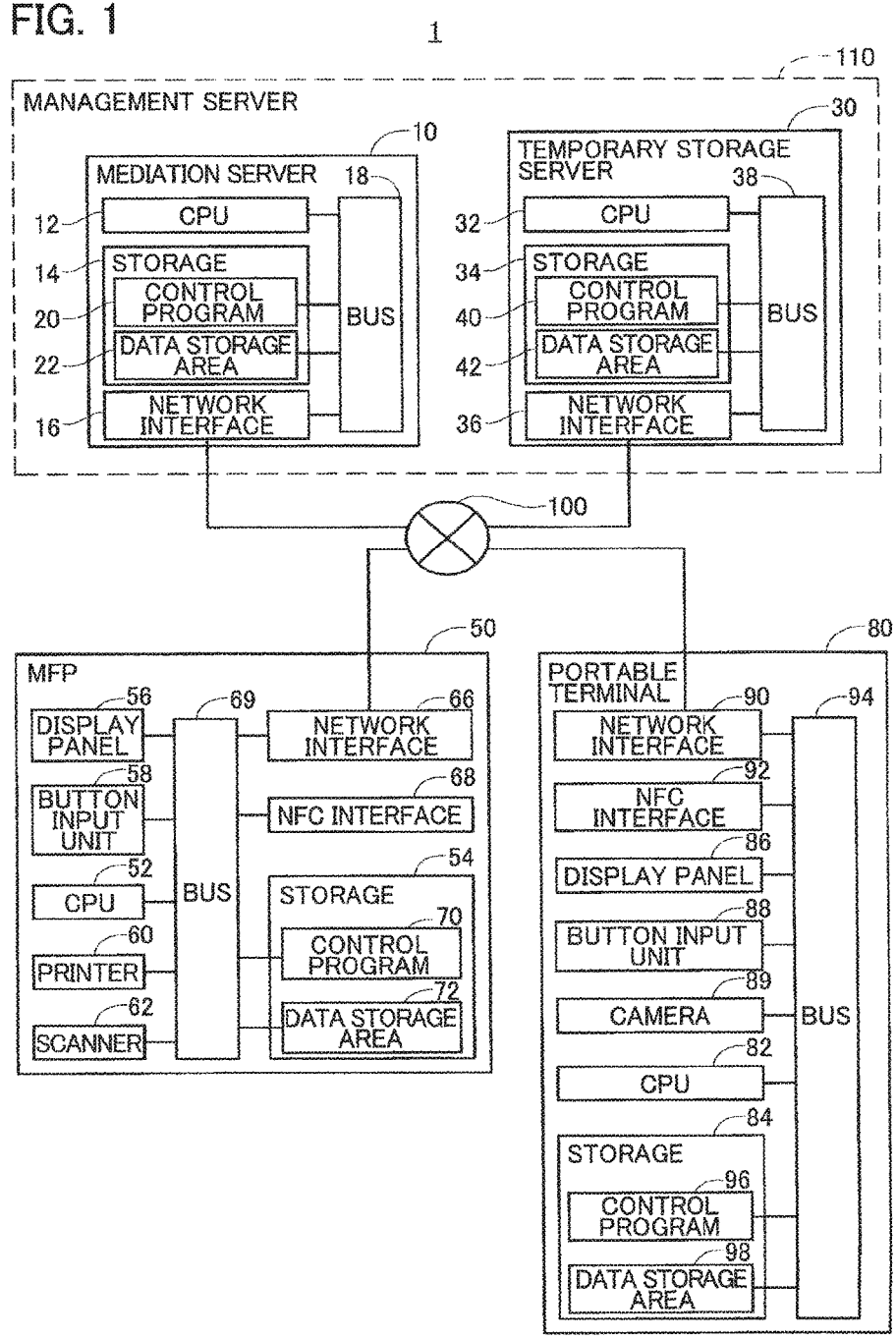
FIG. 1 is a block diagram showing a communication system according to an embodiment.

FIG. 1 is a block diagram showing a communication system 1 illustrating an embodiment. The communication system 1 is provided with a mediation server 10, a temporary storage server 30, a multifunction peripheral (MFP) 50 (an example of the image processing apparatus), and a portable terminal 80 (an example of the terminal device). In the communication system 1 of the embodiment, the mediation server 10 and the temporary storage server 30 constitute a management server 110 (an example of the management server).

In the communication system 1, the mediation server 10, the temporary storage server 30, the MFP 50, and the portable terminal 80 can communicate with each other via an internet 100. Here, the MFP 50 resides on a local area network (LAN) employed in a home, office, or the like in which the MFP 50 is located. The MFP 50 communicates with the mediation server 10, the temporary storage server 30, and the portable terminal 80 via the LAN and the internet 100. The portable terminal 80 uses Long-Term Evolution (LTE) to communicate with the mediation server 10, the temporary storage server 30, and the MFP 50 over the internet 100. LTE is a wireless communication standard developed by the 3rd Generation Partnership Project (3GPP).

The MFP 50 and the portable terminal 80 of the communication system 1 can also communicate with each other using near-field communication (NFC), which is a communication standard for short-range wireless communications. Communication is established with NFC by bringing the portable terminal 80 near the MFP 50.

The mediation server 10 primarily includes a central processing unit (CPU) 12, a storage 14, and a network interface 16. These components can communicate with each other via a bus 18.

The CPU 12 executes processes according to a control program 20 stored in the storage 14. The control program 20 is a program for executing a printing process using the communication system 1. The storage 14 is configured of a combination of storage memory that includes random access memory (RAM), read-only memory (ROM), flash memory, a hard disk drive (HDD), and a buffer provided in the CPU 12. The storage 14 is also provided with a data storage area 22. The data storage area 22 serves to store data and the like required when executing the control program 20. The network interface 16 functions to transmit and receive signals over the internet 100 and the like.

The temporary storage server 30 primarily includes a CPU 32, a storage 34, and a network interface 36. These components can communicate with each other via a bus 38.

The CPU 32 executes processes according to a control program 40 stored in the storage 34. The control program 40 is a program for executing a printing process using the communication system 1. The storage 34 is configured of a combination of storage memory that includes RAM, ROM, flash memory, an HDD, and a buffer provided in the CPU 32. The storage 34 is also provided with a data storage area 42. The data storage area 42 serves to store data and the like required when executing the control program 40. The network interface 36 functions to transmit and receive signals over the internet 100 and the like.

The MFP 50 is primarily provided with a CPU 52, a storage 54, a display panel 56, a button input unit 58, a printer 60, a scanner 62, a network interface 66, and an NFC interface 68. These components can communicate with each other via a bus 69.

The CPU 52 executes processes according to a control program 70 stored in the storage 54. The control program 70 functions to execute a printing process using the communication system 1. The storage 54 is configured of a combination of memory that includes RAM, ROM, flash memory, an HDD, and a buffer provided in the CPU 52. The storage 54 is also provided with a data storage area 72. The data storage area 72 stores data and the like required for executing the control program 70.

The display panel 56 is provided with a display screen that displays various functions of the MFP 50. The button input unit 58 has touch sensors and is integrally configured with the display panel 56. The button input unit 58 detects when an input medium contacts or comes near the display panel 56 and receives button operations performed by the user.

The printer 60 is the section of the MFP 50 that performs printing. The scanner 62 is the section that performs scanning. The network interface 66 functions to transmit and receive signals over a LAN, the internet 100, and the like. The NFC interface 68 functions to transmit and receive signals using NFC.

The portable terminal 80 includes a CPU 82, a storage 84, a display panel 86, a button input unit 88, a camera 89, a network interface 90, and an NFC interface 92. These components can communicate with each other via a bus 94.

The CPU 82 executes processes according to a control program 96 stored in the storage 84. The control program 96 serves to execute a printing process using the communication system 1. The storage 84 is configured of a combination of memory that includes RAM, ROM, flash memory, an HDD, and a buffer provided in the CPU 82. The storage 84 is also provided with a data storage area 98. The data storage area 98 stores data and the like required for executing the control program 96.

The display panel 86 is provided with a display screen that displays various functions of the portable terminal 80. The button input unit 88 has touch sensors and is integrally configured with the display panel 86. The button input unit 88 detects when an input medium contacts or is brought near the display panel 86 and receives button operations performed by the user. The camera 89 is a section of the portable terminal 80 that captures images. The network interface 90 functions to transmit and receive signals over the internet 100 and the like. The NFC interface 92 functions to transmit and receive signals using NFC.

Printing Process Performed by the MFP Using the Management Server

In the communication system 1, the mediation server 10 can be used for controlling the MFP 50 to implement various processes including the printing process. For example, when the management server 110 is used to control the MFP 50 to execute a printing process, the user accesses the management server 110 from the MFP 50 to acquire a prescribed Uniform Resource Locator (URL). Next, the user accesses the management server 110 from the portable terminal 80 using the acquired URL and uploads desired image data to the management server 110. At this time, the user acquires a PIN code from the management server 110. Subsequently, the user again accesses the management server 110 from the MFP 50 and inputs the PIN code to the management server 110. As a result, the MFP 50 acquires the image data from the management server 110 and executes a printing process.

Below, the printing process performed on the MFP 50 using the management server 110 will be described in greater detail with reference to the sequence diagrams shown in FIGS. 2 through 6. Note that information related to the MFP 50 and other image processing apparatuses is stored in the data storage area 22 of the mediation server 10 constituting the management server 110. As shown in FIG. 13, the information related to each image processing apparatus includes the model name of the image processing apparatus (an example of the model identification information), the types of files that an image processing apparatus having this model name can print (hereinafter called "supported file formats"), and the print settings that an image processing apparatus having this model name can process (hereinafter called "supported print settings"; an example of the configuration options). In this specification, information correlating the model name, supported file formats, and supported print settings are correlated with each other, and this information will be called "model information." Further, each process performed on the mediation server 10 in the following sequence is executed by the CPU 12 according to the control program 20; each process performed on the temporary storage server 30 in the following sequence is executed by the CPU 32 according to the control program 40; each process performed on the MFP 50 in the following sequence is executed by the CPU 52 according to the control program 70; and each process performed on the portable terminal 80 in the following sequence is executed by the CPU 82 according to the control program 96.

Figure 2:
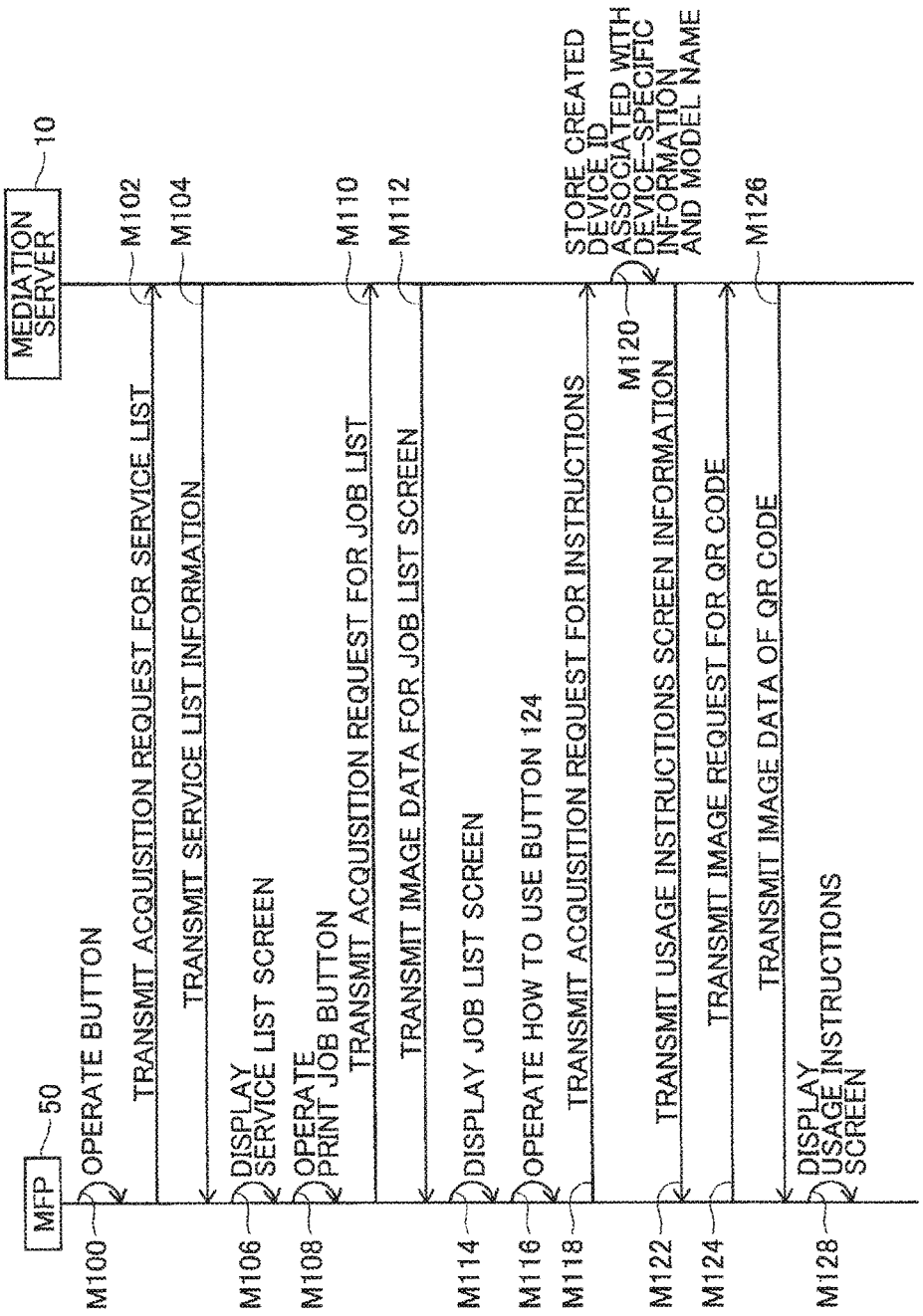
FIG. 2 is a sequence diagram illustrating operations between a multifunction peripheral and a mediation server for registering device ID according to the embodiment.
Figure 3:
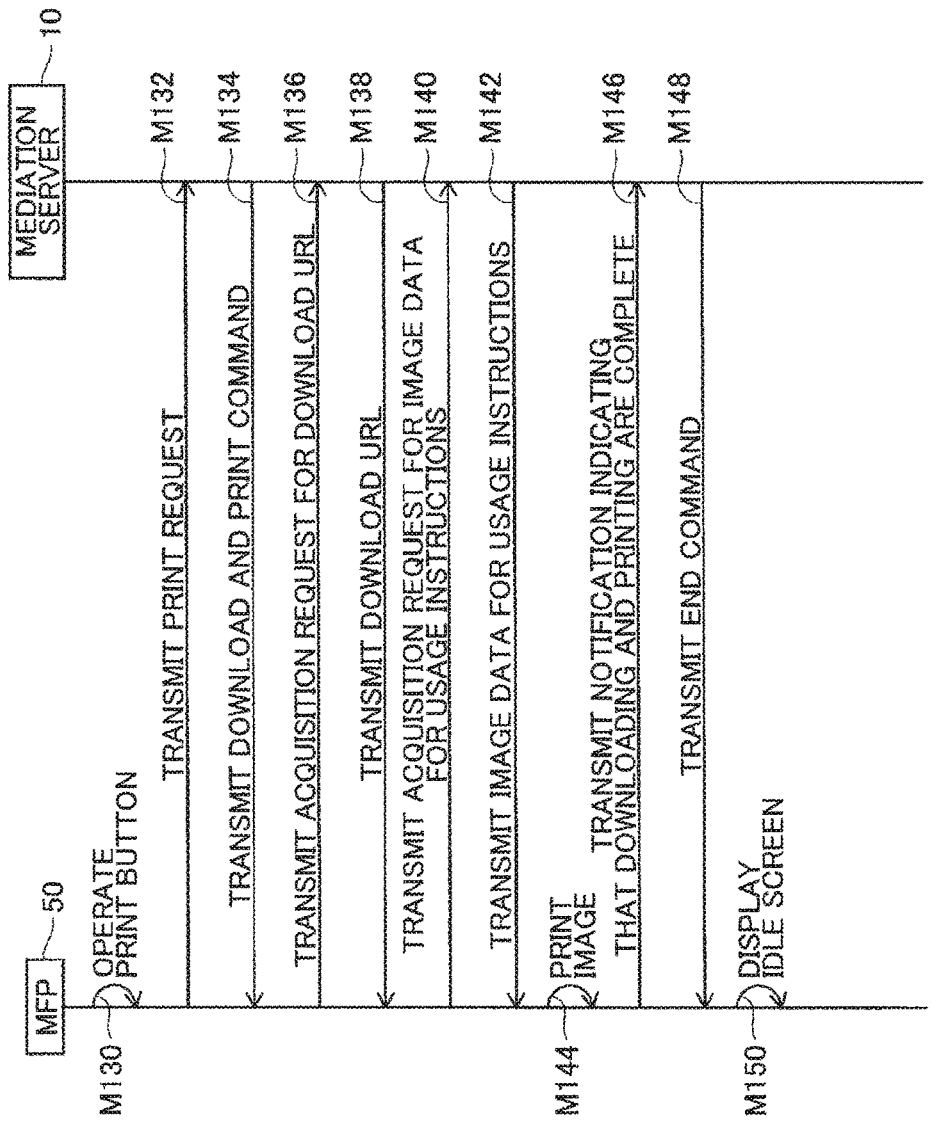
FIG. 3 is a sequence diagram illustrating operations between the multifunction peripheral and the mediation server for printing an image of usage instructions according to the embodiment.

More specifically, in M100 of FIG. 2 the user first operates a button on the MFP 50 for executing one of various processes using the management server 110. In response, in M102 the MFP 50 transmits an acquisition request to the mediation server 10 for acquiring service list information. When transmitting any information to the mediation server 10, the MFP 50 includes, in the information, model name of the MFP 50 and device-specific information such as Media Access Control (MAC) address of the MFP 50. Service list information includes all processes that the image processing apparatus (the MFP 50 for example) can implement using the management server 110. The service list information is stored in the data storage area 22 of the mediation server 10 for each model of image processing apparatus, i.e., for each model name. In response to receiving an acquisition request for service list information, in M104 the mediation server 10 transmits the service list information corresponding to the model name received with the request to the MFP 50.

Here, the service list information includes image data for a screen (hereinafter called a "service list screen") that allows the user to select a desired process from among all processes that the image processing apparatus can implement using the management server 110. Thus, after receiving the service list information, in M106 the MFP 50 displays the service list screen on the display panel 56. The displayed service list screen includes a plurality of operating buttons corresponding to all processes that the image processing apparatus can implement using the management server 110. The operating buttons include a Print Job button.

After the user operates the Print Job button in the service list screen in M108, in M110 the MFP 50 transmits an acquisition request to the mediation server 10 to acquire job list information. As will be described later in greater detail, job list information specifies a list of jobs that are to be subjected to a printing process, and specifically, a list of IDs for identifying image data to be subjected to printing processes (hereinafter called "job IDs"; an example of the identification information and specification information) and includes image data for a screen that allows the user to select a desired job ID from the list of job IDs (hereinafter called a "job list screen"). Note that a job ID is recorded in the mediation server 10 only after image data to be printed has been uploaded to the management server 110. A job ID has not been recorded on the mediation server 10 at the moment the acquisition request for job list information is transmitted to the mediation server 10 in M110 because image data to be printed has not been uploaded to the management server 110 in this case. Hence, in M112 the mediation server 10 transmits image data for a job list screen that does not include job IDs to the MFP 50 as the job list information.

Figure 7:
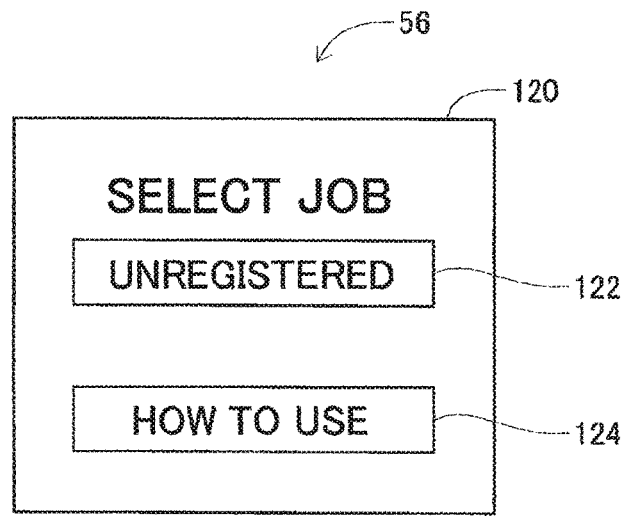
FIG. 7 is an explanation diagram illustrating a job list screen according to the embodiment.

After receiving image data for the job list screen constituting the job list information, in M114 the MFP 50 displays a job list screen 120 on the display panel 56, as shown in FIG. 7. The job list screen 120 displayed on the display panel 56 includes a Select Job button 122 that displays job IDs so that the user can select a desired job ID, and a How to Use button 124 (or Usage Instructions button). However, since the image data for the job list screen transmitted in M112 does not include a job ID, the job ID is not displayed in the Select Job button 122. The How to Use button 124 is provided for viewing (or specifying) the methods of executing a printing process using the management server 110. In M116 the user operates the How to Use button 124 to execute a printing process using the management server 110.

In response to this operation, in M118 the MFP 50 transmits an acquisition request to acquire instructions on how to execute a printing operation (hereinafter also called "usage instructions"). In response to receiving this acquisition request to acquire usage instructions, in M120 the mediation server 10 creates a device ID (an example of the unique information) for identifying the MFP 50. The mediation server 10 stores this device ID in the data storage area 22 in association with the device-specific information and the model name for the MFP 50, as shown in FIG. 14. Since the MFP 50 includes its device-specific information and model name when transmitting various information as described above, the mediation server 10 stores the device-specific information and the model name, which are included in the acquisition request to acquire usage instructions, in association with the device ID created above. In this way, the MFP 50 is registered on the mediation server 10. Here, information correlating a device ID, device-specific information, and a model name will be called registered device information. In the embodiment, the mediation server 10 records "112233" as the device-specific information for the MFP 50, "mn-1" as the model name of the MFP 50, and "123456" as the device ID for the MFP 50.

Figure 8:
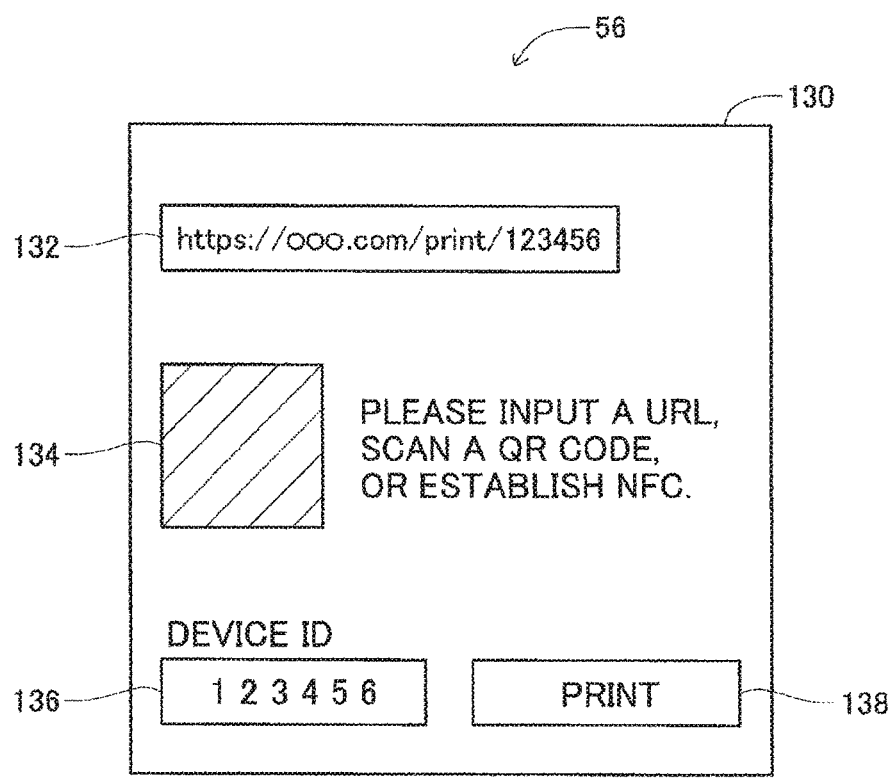
FIG. 8 is an explanation diagram illustrating a usage instructions screen according to the embodiment.

In M122 the mediation server 10 transmits usage instructions screen information to the MFP 50. The usage instructions screen information includes image data for a screen (hereinafter called the "usage instructions screen") that informs the user how to perform a printing process using the management server 110. However, this image data represents text, and the usage instructions screen includes an image of a QR code (a registered trademark of Denso Wave Incorporated), as will be described later. In other words, the usage instructions screen information does not include image data of the QR code. Therefore, in response to receiving usage instructions screen information, in M124 the MFP 50 transmits an image request for the QR code to the mediation server 10. In M126 the mediation server 10 transmits image data of the QR code to the MFP 50. Through this process, in M128 the MFP 50 displays a usage instructions screen 130 on the display panel 56, as shown in FIG. 8.

The usage instructions screen 130 displayed on the display panel 56 includes a URL display field 132, and a QR code (an example of the location information) 134. The URL to be used for uploading image data to the management server 110 (an example of the location information) is displayed in the URL display field 132. The URL designates the location of the management server 110 (specifically, the mediation server 10). The URL displayed in the URL display field 132 is unique to the MFP 50. In this example, the URL includes the device ID "123456" for the MFP 50. The QR code 134 is an image encoding the URL displayed in the URL display field 132. Accordingly, the user can access the website for uploading image data to the management server 110 by inputting the URL displayed in the URL display field 132 into the address bar of a browser on the portable terminal 80 or by reading the QR code 134 with a camera provided in the portable terminal 80.

Further, the website for uploading image data to the management server 110 can be accessed not only by inputting a URL and reading the QR code 134, but also by bringing the portable terminal 80 near the MFP 50 to establish NFC. Specifically, the information for the usage instructions screen transmitted to the MFP 50 in M122 includes a write command (an example of the location information) to write the URL to a wireless tag using NFC. In response to this write command, the MFP 50 writes the above URL to a wireless tag (not shown) in the NFC interface 68. Thereafter, the user can place the portable terminal 80 near the MFP 50 to establish NFC between the MFP 50 and the portable terminal 80, and the MFP 50 will transmit the URL displayed in the URL display field 132 to the portable terminal 80 through NFC. In this way, the portable terminal 80 can access the website for uploading image data to the management server 110. That is, the user can input a URL, scan a QR code, or establish NFC in conformance with the message "Please input a URL, scan a QR code, or establish NFC" shown next to the QR code 134 in FIG. 8 in order to access the website for uploading image data to the management server 110.

The usage instructions screen 130 displayed on the display panel 56 also includes a device ID display field 136, and a Print button 138. The device ID of the MFP 50 is displayed in the device ID display field 136. When the Print button 138 is selected, the MFP 50 prints the URL displayed in the URL display field 132 and the QR code 134. Specifically, when the user operates the Print button 138 in the usage instructions screen 130 in M130 of FIG. 3, in M132 the MFP 50 transmits a print request to the mediation server 10.

In M134 the mediation server 10 transmits a download and print command to the MFP 50, and in M136 the MFP 50 transmits an acquisition request to the mediation server 10 to acquire the download URL. In M138 the mediation server 10 transmits the download URL to the MFP 50. The download URL is the URL of a website on the mediation server 10 that stores image data of the URL displayed in the URL display field 132 and the image represented by the QR code 134 (hereinafter called "image data for usage instructions"). Accordingly, while using the download URL received from the mediation server 10, the MFP 50 accesses the mediation server 10, and in M140 transmits an acquisition request to acquire image data for usage instructions.

In response to receiving the acquisition request to acquire image data for usage instructions, in M142 the mediation server 10 transmits the image data for usage instructions to the MFP 50. In M144 the MFP 50 prints an image based on the image data for usage instructions received in M142. In this way, the user acquires a sheet of paper on which the URL displayed in the URL display field 132 and the QR code 134 have been printed, and can access the website for uploading image data to the management server 110 using the information printed on this sheet. Note that once the MFP 50 has completed printing, in M146 the MFP 50 transmits a notification to the mediation server 10 indicating that downloading and printing are complete. In M148 the mediation server 10 transmits an end command to the MFP 50, and in M150 the MFP 50 displays an idle screen on the display panel 56.

Figure 4:
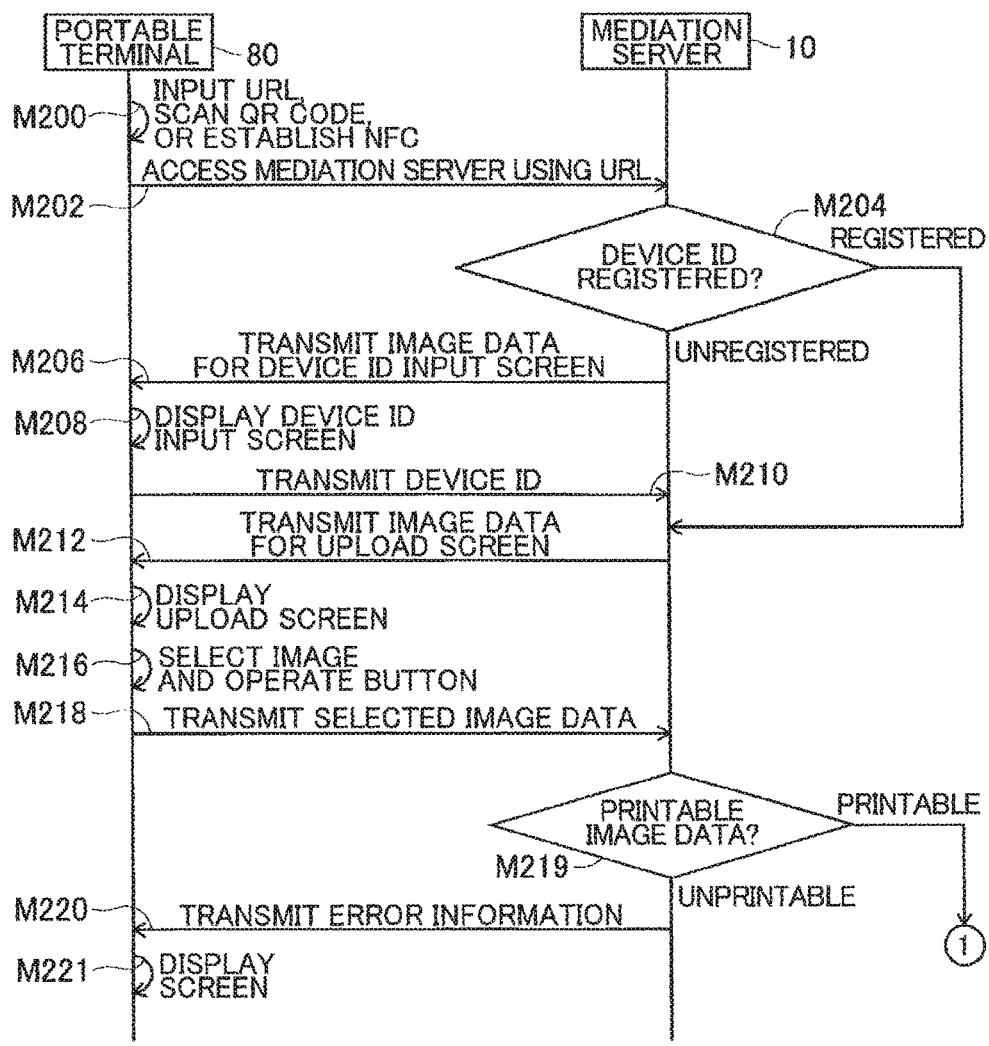
FIG. 4 is a sequence diagram illustrating operations between a portable terminal and the mediation server for transmitting image data according to the embodiment.
Figure 5:
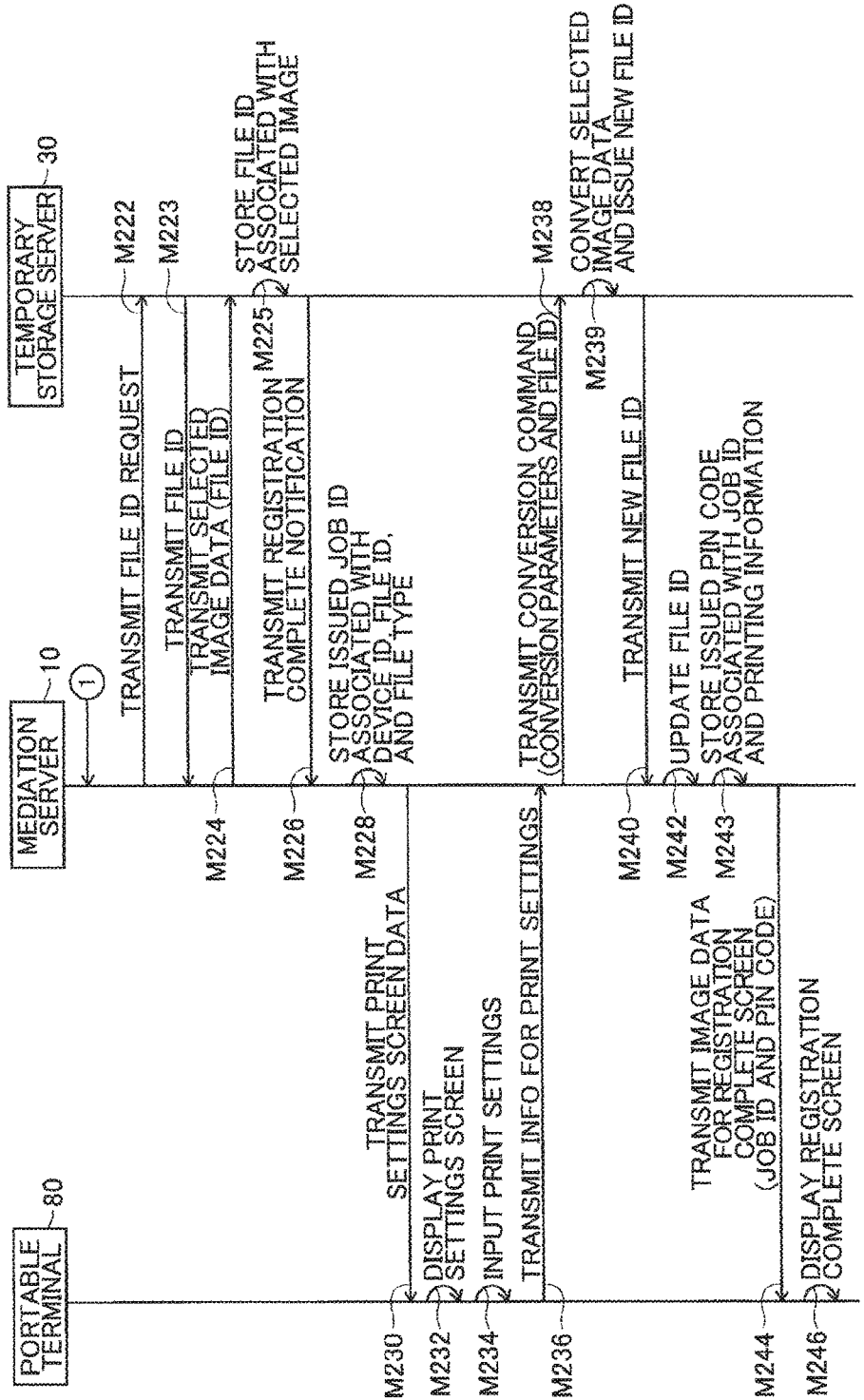
FIG. 5 is a sequence diagram illustrating operations between the portable terminal, the mediation server, and a temporary storage server for transmitting print settings according to the embodiment.

In M200 of FIG. 4, the user performs an operation with the portable terminal 80 to input the URL shown in the usage instructions screen 130 or on the printed sheet, to scan the QR code from the usage instructions screen 130 or the printed sheet, or to establish NFC between the MFP 50 and the portable terminal 80. Through one of these operations, in M202 the user accesses the mediation server 10 through the portable terminal 80. When the user accesses the mediation server 10, in M204 the mediation server 10 extracts the device ID in the URL used for access and determines whether the device ID is registered on the mediation server 10. That is, the mediation server 10 determines whether the device ID in the URL is stored in the registered device information shown in FIG. 14.

If the device ID is not registered (M204: unregistered), in M206 the mediation server 10 transmits image data for a device ID input screen to the portable terminal 80. In M208 the portable terminal 80 displays the device ID input screen on the display panel 86. This screen includes a device ID input field and a message prompting the user to input a device ID. The user inputs a device ID into the input field in response to this message. Here, the user employs some technique for storing (or memorizing) the device ID that was displayed in the device ID display field 136 of the usage instructions screen 130 and subsequently inputs this device ID into the input field. Once the device ID has been inputted on the portable terminal 80, in M210 the portable terminal 80 transmits this device ID to the mediation server 10. In response to receiving the device ID, the mediation server 10 executes the process in M212 described below. When it is determined that the device ID is not registered (M204: unregistered), there is likely that the device ID included in the URL inputted in the portable terminal 80 has some errors such as mistype. By transmitting the device ID again in M204, errors caused by the mistype, for example, can be corrected.

Figure 9:
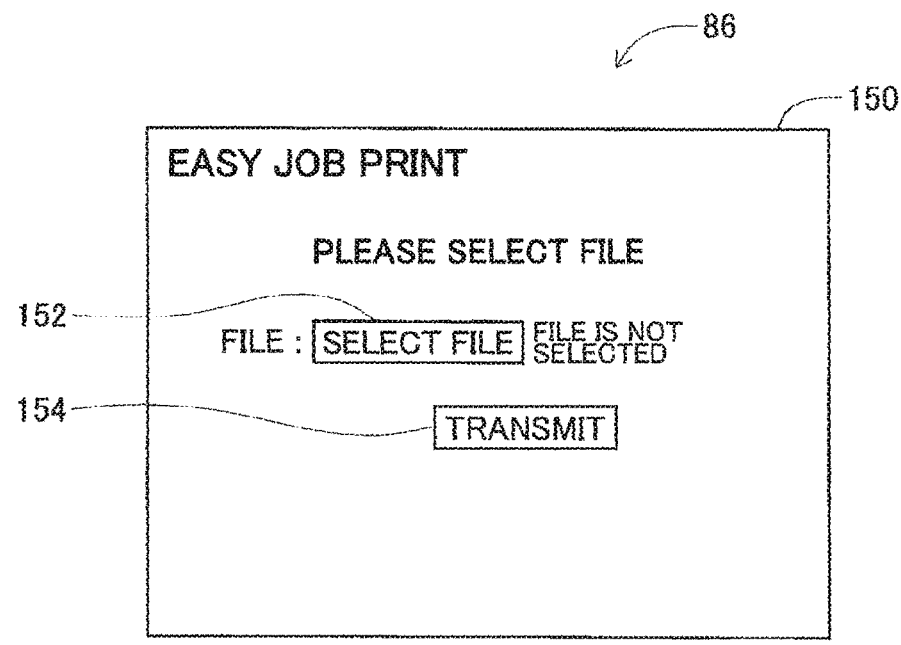
FIG. 9 is an explanation diagram illustrating an upload screen according to the embodiment.

Alternatively, if the device ID in the URL is registered on the mediation server 10 (M204: registered), the mediation server 10 directly executes the process in M212. In M212 the mediation server 10 transmits image data for an upload screen to the portable terminal 80. In M214 the portable terminal 80 displays an upload screen 150, such as that shown in FIG. 9, on the display panel 86 based on the image data received from the mediation server 10. The upload screen 150 displayed on the display panel 86 includes a Select button 152, and a Send button 154. The Select button 152 is operated to select image data to be printed (or to be uploaded). By operating the Select button 152, the user can select any image data stored in the data storage area 98 of the portable terminal 80. After selecting image data, the user operates the Send button 154 in the upload screen 150 in M216, and in M218 the portable terminal 80 transmits the image data selected when the user operated the Select button 152 (hereinafter called the "selected image data"; an example of the original image data) to the mediation server 10.

In response to receiving the selected image data, in M219 the mediation server 10 determines whether the selected image data is supported (can be printed) by the image processing apparatuses registered on the mediation server 10. Specifically, the mediation server 10 identifies the model name stored in association with the device ID in the URL which was used for accessing the mediation server 10 in M202 or the device ID which was received in M210 by referencing the registered device information in FIG. 14. Next, the mediation server 10 identifies the supported file formats stored in association with this model name by referencing the model information in FIG. 13. If the file format of the selected image data is not included in the supported file formats identified above, the mediation server 10 determines that the selected image data cannot be printed by the image processing apparatus registered on the mediation server 10 (M219: unprintable) and in M220 transmits error information to the portable terminal 80. In response to receiving error information, in M221 the portable terminal 80 displays a screen on the display panel 86 specifying that the selected image cannot be printed.

On the other hand, if the file format of the selected image data is included in the supported file formats identified above, the mediation server 10 determines that the selected image data can be printed on the image processing apparatus (the MFP 50 in this case) registered on the mediation server 10 (M219: printable). Therefore, in M222 of FIG. 5 the mediation server 10 transmits a file ID request to the temporary storage server 30. In response to receiving this request, in M223 the temporary storage server 30 issues a file ID and transmits this file ID to the mediation server 10. In M224 the mediation server 10 transmits the file ID received from the temporary storage server 30 together with the selected image data to the temporary storage server 30. In M225 the temporary storage server 30 stores the file ID and the selected image data in association with each other in the data storage area 42. This completes the process of uploading, to the management server 110, image data to be printed.

After storing the file ID and the selected image data in association with each other, in M226 the temporary storage server 30 transmits a registration complete notification to the mediation server 10. In M228 the mediation server 10 issues a job ID and stores this job ID in the data storage area 22 in association with the device ID used in M219, the file ID received in M223, and the file format of the selected image data, as shown in FIG. 15. Here, information correlating the job ID, the device ID, the file ID, and the file format will be called job information.

In M230 the mediation server 10 transmits print settings screen data to the portable terminal 80. The print settings screen data is image data of a screen used to modify print settings (hereinafter called the "print settings screen"). Print settings screen data for each model of image processing apparatus is stored in the data storage area 22 of the mediation server 10. Specifically, as indicated in the model information shown in FIG. 13, an image processing apparatus having model name "mn-1" can perform duplex printing and can print on sheets of A3, A4, and letter sizes. However, an image processing apparatus having model name "mn-2" cannot perform duplex printing and can only print on sheets of A4 and letter sizes. Consequently, the print settings screen data for an image processing apparatus with model name "mn-1" is used to display a print settings screen offering an option for selecting duplex printing and an option for selecting one of the paper sizes A3, A4, and letter, while the print settings screen data for an image processing apparatus having model name "mn-2" is used to display a print settings screen offering an option to select one of the paper sizes A4 and letter, but no option for duplex printing.

The mediation server 10 references the registered device information in FIG. 14 to identify the model name stored in association with the device ID registered in M228. Next, the mediation server 10 identifies the print settings screen data corresponding to an image processing apparatus having this model name. In M230 the mediation server 10 transmits this print settings screen data to the portable terminal 80. In M232 the portable terminal 80 displays the print settings screen on the display panel 86. Accordingly, the print settings screen displayed on the display panel 86 includes only configuration options supported by the image processing apparatus that will be used to execute the printing process.

In M234 the user selects and inputs desired print settings in the print settings screen. In M236 the portable terminal 80 transmits information for the print settings inputted into the print settings screen (hereinafter called "printing information") to the mediation server 10. In this way, the portable terminal 80 transmits printing information to the mediation server 10 for configuration options supported by the image processing apparatus that will execute the printing process. In response to receiving this printing information, the mediation server 10 determines whether the selected image data must be converted to image data for printing that corresponds to the printing information.

If the mediation server 10 determines that the selected image data must be converted at this time, in M238 the mediation server 10 transmits a conversion command to the temporary storage server 30. The conversion command includes the file ID and conversion parameters. Conversion parameters provide details on converting the selected image data and depend on the printing information. In response to receiving the conversion command, in M239 the temporary storage server 30 converts the selected image data associated with the file ID on the basis of the conversion parameters. Subsequently, the temporary storage server 30 issues a new file ID different from the file ID issued previously and stores this new file ID in the data storage area 42 in association with the converted image data. In other words, the temporary storage server 30 stores a file ID in association with the selected image data in M225 and subsequently in M239 stores a file ID, which is different from the file ID stored in M225, in association with image data produced by converting the selected image data.

In M240 the temporary storage server 30 transmits the newly issued file ID to the mediation server 10. In response to receiving this file ID, in M242 the mediation server 10 updates the file ID stored in the job information of FIG. 15 to the new file ID received from the temporary storage server 30. Thus, the file ID in the job information is updated to reflect the file ID corresponding to the converted selected image data. In M243 the mediation server 10 issues a PIN code (an example of the authentication information) and stores this PIN code in association with the printing information received in M236 and the job ID issued in M228 (and updated in M242) as the job information in FIG. 15. Thus, the job information stored in FIG. 15 correlates a device ID with a job ID, a file ID, a file format, a PIN code, and printing information. Here, the date and time at which the PIN code and the like are stored in M243 are also recorded in the job information as the recorded date and time. Further, an error count is also stored in the job information. The error count will be described later in greater detail.

Figure 10:
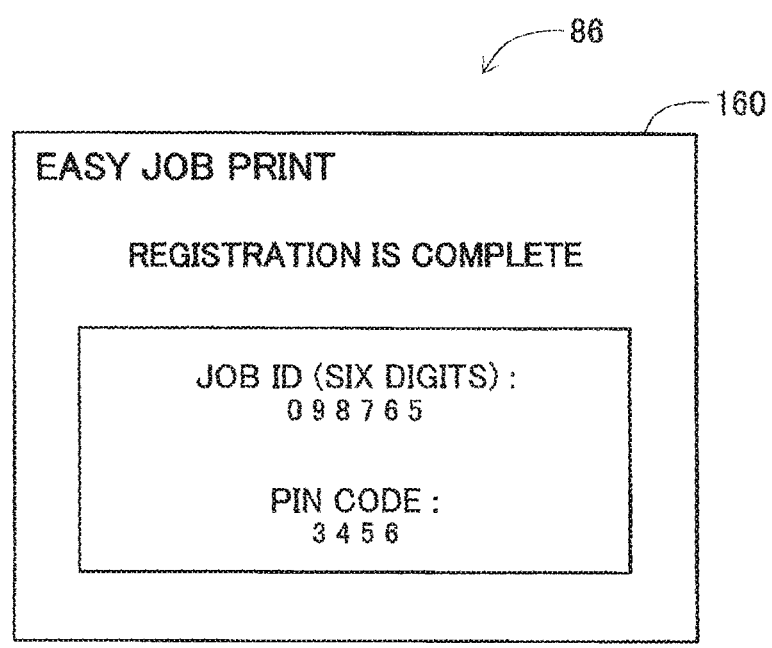
FIG. 10 is an explanation diagram illustrating a registration complete screen according to the embodiment.

After the PIN code and the like are stored on the mediation server 10, in M244 the mediation server 10 transmits image data for a registration complete screen to the portable terminal 80. The image data for the registration complete screen includes the PIN code and the job ID stored in M243. In response to receiving image data for a registration complete screen, in M246 the portable terminal 80 displays a registration complete screen 160 shown in FIG. 10 on the display panel 86. The registration complete screen 160 displayed on the display panel 86 includes the job ID and the PIN code. Accordingly, the user acquires the job ID and the PIN code and uses this data to print an image based on the selected image data.

Figure 6:
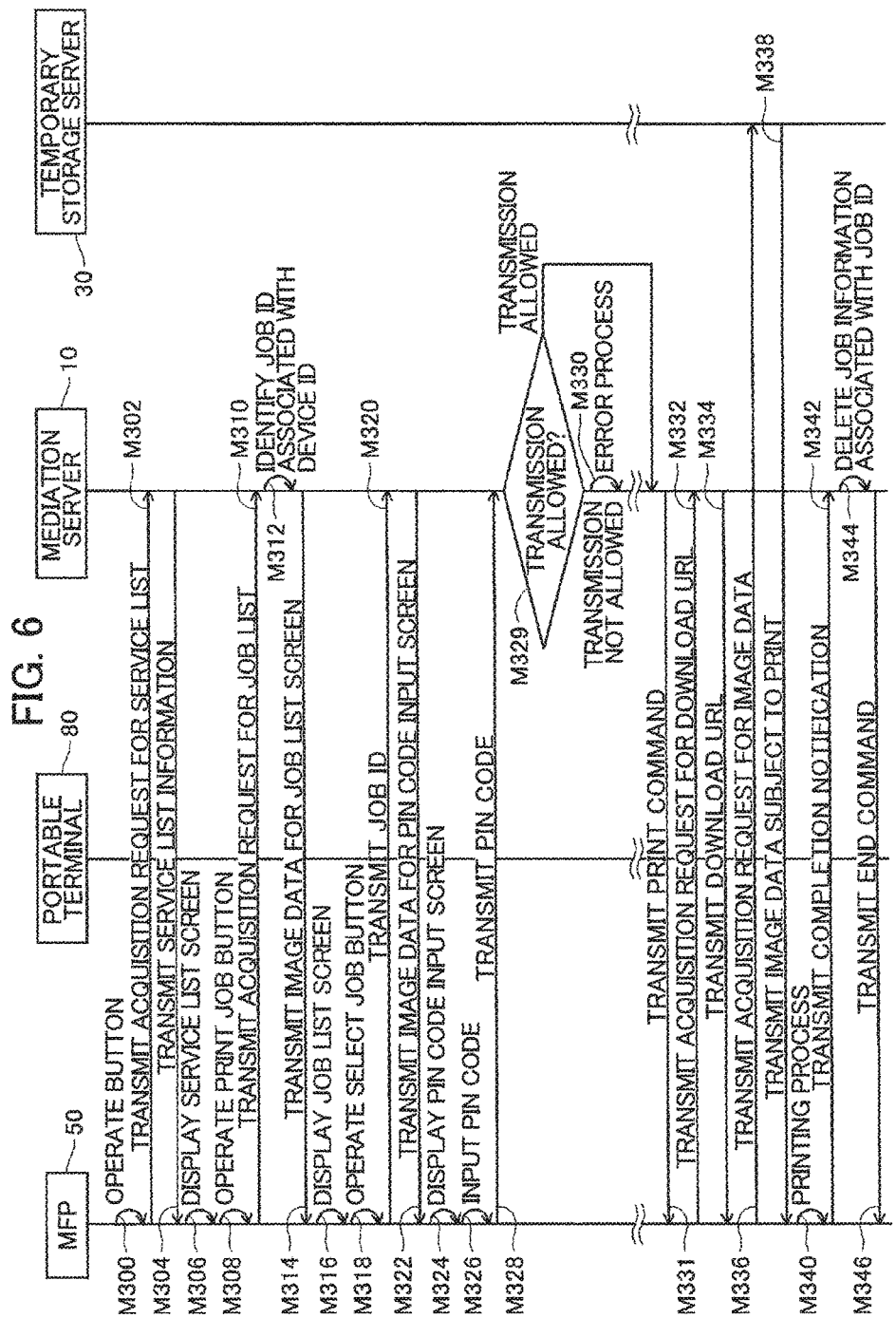
FIG. 6 is a sequence diagram illustrating operations between the multifunction peripheral, the portable terminal, the mediation server, and a temporary storage server for printing an image according to the embodiment.

Specifically, in M300 of FIG. 6 the user operates a button on the MFP 50 for executing one of various processes employing the management server 110. This process is identical to the process in M100 of FIG. 2. After executing the process of M300, the process in M302-M310 is executed. A description of this process will be omitted since the process is identical to that in M102-M110. After the MFP 50 transmits an acquisition request for job list information to the mediation server 10 in M310, in M312 the mediation server 10 references the registered device information in FIG. 14 to identify the device ID stored in association with the device-specific information that was transmitted together with the acquisition request for the job list information in M310. Subsequently, the mediation server 10 references the job information in FIG. 15 to identify the job ID(s) stored in association with this device ID.

After identifying the job ID(s), in M314 the mediation server 10 transmits image data for a job list screen that includes the job ID(s) to the MFP 50 as the job list information. In response to receiving image data for the job list screen as job list information, in M316 the MFP 50 displays the job list screen 120 on the display panel 56, as shown in FIG. 11. As with the job list screen 120 displayed in M114 of FIG. 2, this job list screen 120 includes the Select Job button 122 and the How to Use button 124. However, unlike the job list screen 120 in FIG. 7, a job ID is displayed in the Select Job button 122 of the job list screen 120 shown in FIG. 11.

After verifying that the job ID displayed in the Select Job button 122 is the same as the job ID acquired in M246 (see FIG. 5), in M318 the user operates the Select Job button 122. In response, in M320 the MFP 50 transmits the job ID displayed in the Select Job button 122 to the mediation server 10. In response to receiving this job ID, in M322 the mediation server 10 transmits image data for a PIN code input screen to the MFP 50. In M324 the MFP 50 displays a PIN code input screen 170 shown in FIG. 12 on the display panel 56. The PIN code input screen 170 displayed on the display panel 56 includes a PIN code input field 172 in which a PIN code can be entered.

In M326 the user inputs the PIN code acquired in M246 (see FIG. 5) in the PIN code input field 172, and in M328 the MFP 50 transmits the entered PIN code to the mediation server 10. In response to receiving the PIN code, in M329 the mediation server 10 determines whether to allow transmission of a print command to the MFP 50. Specifically, the mediation server 10 references the job information in FIG. 15 to determine in M329 whether the PIN code received from the MFP 50 matches the PIN code stored in association with the job ID received in M320. In other words, the mediation server 10 references the job information in FIG. 15 to identify the PIN code stored in association with the job ID that was received in M320, and determines whether the PIN code identified in this job information matches the PIN code received from the MFP 50.

If the PIN codes do not match, the mediation server 10 determines that a print command cannot be transmitted to the MFP 50 (M329: transmission not allowed) and in M330 increments the error count stored in the job information in association with the job ID received in M320. Initially, the error count is set to a value of 0. If the incremented error count exceeds a preset number, the mediation server 10 deletes the job information associated with the job ID received in M320. That is, if the incremented error count exceeds the preset number, the mediation server 10 determines that a print command cannot be transmitted to the MFP 50 (M329: transmission not allowed).

If the PIN codes match and the incremented error count does not exceed the preset number, the mediation server 10 identifies the recorded date and time stored in the job information in association with the job ID received in M320 and calculates the amount of time that has elapsed since the recorded date and time. That is, the mediation server 10 calculates the elapsed time from the recorded date and time to the date and time at which the PIN code was received in M328. If the elapsed time exceeds a preset time, the mediation server 10 determines that a print command cannot be transmitted to the MFP 50 (M329: transmission not allowed) and in M330 deletes the job information associated with the job ID received in M320.

However, if the elapsed time does not exceed the preset time, the mediation server 10 determines that a print command may be transmitted to the MFP 50 (M329: transmission allowed) and in M331 transmits a print command to the MFP 50. Hence, the mediation server 10 determines that a print command may be transmitted to the MFP 50 (M329: transmission allowed) and transmits this print command to the MFP 50 only when the PIN code received from the MFP 50 matches the registered PIN code, the number of times an unregistered PIN code was inputted is within the preset number, and the PIN code was inputted within the preset time after the date and time that the selected image was registered. In this way, the mediation server 10 can suitably ensure confidentiality of the selected image. The mediation server 10 creates the print command to be transmitted to the MFP 50 on the basis of the file format and the print information stored in the job information in association with the job ID received in M320. Accordingly, the MFP 50 that receives this print command can execute a printing process conforming to the print settings inputted in M234 (see FIG. 5).

In response to receiving the print command, in M332 the MFP 50 transmits an acquisition request for a download URL to the mediation server 10. In response to receiving this acquisition request for a download URL, the mediation server 10 identifies the file ID stored in the job information in association with the job ID received in M320 and creates a URL for allowing the MFP 50 to acquire the selected image data stored on the temporary storage server 30 in association with this file ID. In M334 the mediation server 10 transmits this URL to the MFP 50 as the download URL.

In M336 the MFP 50 uses the download URL to access the temporary storage server 30 and transmits to the temporary storage server 30 an acquisition request for image data for printing. In response to this acquisition request, in M338 the temporary storage server 30 transmits either selected image data received in M224 (see FIG. 5) or selected image data converted according to a conversion command received in M238 (see FIG. 5) to the MFP 50 as image data for printing (an example of the target image data). In M340 the MFP 50 executes a printing process for printing an image based on the image data for printing received in M338 in accordance with the print command received in M331.

After completing the printing process, in M342 the MFP 50 transmits a completion notification to the mediation server 10. In response to receiving this completion notification, in M344 the mediation server 10 deletes the job information stored in association with the job ID received in M320. In this way, the mediation server 10 can delete job information after the corresponding printing process is completed in order to ensure confidentiality of the selected image. In M346 the mediation server 10 transmits an end command to the MFP 50, whereby the printing process on the MFP 50 employing the management server 110 ends.

As described above for the communication system 1 of the embodiment, the user registers the MFP 50 on the mediation server 10 simply by accessing the mediation server 10 with the MFP 50 so as to display the job list screen 120 and operating the How to Use button 124 displayed in the job list screen 120. With the conventional technique, the user had to perform various settings for the MFP 50 or other device and transmit information for these settings to a server or the like in order to register the device. Further, with the conventional technique, a driver for the MFP 50 had to be installed on the portable terminal 80 or other terminal device in order to execute a printing operation for printing image data stored on the terminal device. However, as described above for the communication system 1 of the embodiment, the user can acquire a URL, QR code, or the like for uploading image data simply by operating the How to Use button 124 in the job list screen 120 displayed after the user accesses the mediation server 10 with the MFP 50. Subsequently, after uploading image data to the management server 110 using the URL, QR code, or the like, the user inputs a PIN code into the MFP 50, enabling the MFP 50 to print an image based on this image data. That is, with the communication system 1 of the embodiment, the user can execute a printing operation on image data stored on a terminal device, without having to install a driver or the like on the terminal device. In view of this advantage, the operability of performing a printing process on the MFP 50 using the management server 110 can be improved.

In the communication system 1 of the embodiment, though the MFP 50 and the portable terminal 80 do not communicate with each other, except when transmitting and receiving information through NFC, the MFP 50 and the management server 110 can execute a printing process, provided that the MFP 50 and the portable terminal 80 can communicate with the management server 110. Hence, the user can execute a printing process on the MFP 50 using the management server 110, even when the MFP 50 and the portable terminal 80 do not reside on the same LAN. In this way, MFPs 50 and portable terminals 80 present in a variety of environments can cooperate through the management server 110 to execute a printing operation on the MFP 50.

Put another way, to execute a printing process on the MFP 50 using the management server 110 in the communication system 1 of the embodiment, the MFP 50 and the portable terminal 80 operate according to information received from the management server 110. Hence, when functions are added to printing processes performed on the MFP 50 through use of the management server 110, it is sufficient to update the control program on the management server 110 without upgrading the control programs on the MFP 50 and the portable terminal 80. Hence, the communication system 1 can support updated functionality in the printing process using the management server 110 without requiring the user performing upgrade operation on control programs and the like, thereby lightening the user's burden.

Further, since image data to be printed is stored on the temporary storage server 30, the MFP 50 or other image processing apparatus need not be provided with a large-capacity memory, thereby reducing the cost of the image processing apparatus.

The CPU 12 executing M118, M124, and M132 is an example of a location information request receiving unit. The CPU 12 executing M122, M126, and M142 is an example of a location information transmitting unit. The CPU 12 executing M218 is an example of an original image receiving unit. The CPU 332 executing M225 is an example of an original image storing unit. The CPU 12 executing M244 is an example of an identification information transmitting unit. The CPU 12 executing M320 is a specification information receiving unit. The CPU 32 executing M338 is an example of a target image data transmitting unit. The CPU 12 executing M314 is an example of an identification information transmitting unit. The CPU 12 executing M210 is an example of an unique information receiving unit. The CPU 12 executing M219 is an example of a determining unit. The CPU 12 executing M228 is an example of a unique information storing unit and an example of a model identification information storing unit. The CPU 12 executing M236 is an example of settings information receiving unit. The CPU 12 executing M243 is an example of a settings information storing unit. The CPU 12 executing M244 is an example of an authentication information transmitting unit. The CPU 52 executing M340 is an example of an image processing unit. The CPU 12 executing M344 is an example of a deleting unit.

While the disclosure has been described in detail with reference to the above embodiments, it would be apparent to those skilled in the art that various changes and modifications may be made thereto. For example, while the mediation server 10 and the temporary storage server 30 are configured of separate and independent web servers in the embodiment described above, the mediation server 10 and the temporary storage server 30 may be configured of a single web server instead.

The MFP 50 may also possess the functions of the mediation server 10 and the temporary storage server 30. That is, while information is transmitted between the mediation server 10, the temporary storage server 30, and the MFP 50 in the embodiment described above, this information may be internally inputted and outputted within a single device. Note that when the MFP 50 possesses the functions of the mediation server 10 and the temporary storage server 30, the device configured of the mediation server 10, the temporary storage server 30, and the MFP 50 is an example of the image processing apparatus. Further, the CPU 12 of the mediation server 10 executing processes in M118 and M132 in this configuration is an example of the location information request receiving unit. In addition, the CPU 12 of the mediation server 10 executing processes in M122 and M142 in this configuration is an example of the location information outputting unit. In this case, the URL designated through the usage instructions screen 130 displayed in M128 (the URL in the URL display field 132, the URL encoded in the QR code, and the URL written in the wireless tag of the NFC interface 68) designates a location of the MFP 50.

In the embodiment described above, the job information stored on the mediation server 10 is deleted (M344) after the printing process has been executed on the MFP 50 using the management server 110 (M340), but the selected image data stored on the temporary storage server 30 may also be deleted.

In the embodiment described above, the URL for accessing the mediation server 10 includes a device ID, and a different URL is provided for each MFP 50, i.e., for each device. However, a common URL may be provided for all devices instead.

In the embodiment described above, the job list screen 120 is displayed on the MFP 50 on the basis of the job list information transmitted from the mediation server 10 to the MFP 50 (M316), the user has selected a job ID displayed in the job list screen 120 (M318), and subsequently the selected job ID is transmitted to the mediation server 10 (M320). However, the MFP 50 may simply accept input of a job ID, without displaying the job list screen 120, and may transmit the inputted job ID to the mediation server 10. Hence, the mediation server 10 may not transmit job list information to the MFP 50.

In the embodiment described above, the mediation server 10 determines whether the selected image data received from the portable terminal 80 has a file format that is supported by the MFP 50 (M219), but the mediation server 10 need not perform this determination. In other words, the process in M219-M221 may be omitted.

In the embodiment described above, the mediation server 10 requests the user of the portable terminal 80 to input the device ID when the device ID included in the URL that the portable terminal 80 used for accessing the mediation server 10 is not registered on the mediation server 10 (M204: unregistered). However, the mediation server 10 may simply transmit error information to the portable terminal 80 without performing the subsequent steps for receiving device ID input. In other words, the process of M206-M210 may be omitted.

In the embodiment described above, a print command, which includes print settings, and the image data for printing are transmitted to the MFP 50, but the disclosure is not limited to this configuration. For example, print settings may be configured on the MFP 50 after the MFP 50 receives the image data for printing, and the printing process may be executed after print settings have been established. In other words, the process of M230-M242 may be omitted. With this configuration, the mediation server 10 also need not perform such operations as receiving model information from the MFP 50, storing supported print settings, and transmitting print settings screen data. While the mediation server 10 executes the process of M238-M242 in the embodiment, the mediation server 10 may instead be configured to transmit to the MFP 50 print settings screen data common for all models in M230.

In the embodiment described above, the mediation server 10 transmits image data for printing to the MFP 50 when the PIN codes are matched, but the mediation server 10 may simply transmit image data for printing to the MFP 50 without using PIN codes or other authentication information. In other words, the mediation server 10 need not execute the process in M329-M330 and the like.

In the embodiment, the processes shown in FIGS. 2-6 are performed by the CPUs such as the CPU 12, the CPU 32, the CPU 52, and the CPU 82. However, these processes may not be performed such CPUs but may be performed by ASICs or other logic integration circuits or by cooperation or any combination of the CPUs, the ASICs, and other logic integration circuits.

What is claimed is:

1. A management server comprising:
    a communication interface configured to communicate with an image processing apparatus and a terminal device;
    a processor; and
    a memory storing computer-readable instructions therein, the computer-readable instructions, when executed by the processor, causing the management server to perform:
        receiving a location information request from the image processing apparatus, the location information request being for requesting location information of the management server, the location information being for allowing the terminal device to transmit original image data to the management server;
        transmitting the location information to the image processing apparatus as a response to the location information request;
        receiving the original image data which is transmitted from the terminal device after the terminal device accesses the management server by using the location information which is acquired from the image processing apparatus;
        storing the received original image data;
        transmitting identification information identifying the original image data to the terminal device;
        receiving specific information which enables specification of the identification information from the image processing apparatus; and
        transmitting target image data to the image processing apparatus based on the original image data identified by the identification information which is specified by the specific information.

2. The management server according to claim 1, wherein the transmitting the location information transmits the location information corresponding to unique information uniquely identifies the image processing apparatus.

3. The management server according to claim 2, further comprising a storage storing the unique information and at least one set of identification information associated with the unique information,
    wherein the computer-readable instructions cause the management server to further perform transmitting the at least one set of identification information associated with the unique information to the image processing apparatus when a list request is received from the image processing apparatus, the list request being for requesting identification information,
    wherein the target image data is performed in a case where the receiving specific information receives the specific information that matches one of the at least one set of identification information.

4. The management server according to claim 2, wherein the storage stores model information associated with the unique information, the model information identifying a model of the information processing apparatus,
- wherein the computer-readable instructions cause the management server to further perform determining whether the model identified by the model information, which is associated with the unique information corresponding to the location information used when the original image data is received, is capable of processing the received original image data,
- wherein the storing the received original image data is performed when the model is capable of processing the received original image data whereas the storing the received original image data is not performed when the model is incapable of processing the received original image data.

5. The management server according to claim 2, wherein the computer-readable instructions cause the management server to further perform:
- receiving input of the unique information which is transmitted from the information processing apparatus by using information different from the location information transmitted; and
- storing the received unique information so as to be associated with the identification information.

6. The management server according to claim 1, wherein the computer-readable instructions cause the management server to further perform:
- receiving settings information from the terminal device, the settings information concerning settings of an image process; and
- storing the received settings information so as to be associated with the identification information,
- wherein the target image data is transmitted to the image processing apparatus together with an image process instruction including the settings information associated with the identification information.

7. The management server according to claim 6, wherein the computer-readable instructions cause the management server to further perform storing model information identifying a model of the information processing apparatus so as to be associated with the identification information,
- wherein the receiving settings information receives the settings information concerning configuration option settable for the model of the information processing apparatus as information concerning the image process on the original image data identified by the identification information associated with the model information.

8. The management server according to claim 1, further comprising a storage storing first authentication information associated with the identification information,
- wherein the computer-readable instructions cause the management server to further perform:
- transmitting the first authentication information which is associated with the identification information to the terminal device; and
- receiving second authentication information from the terminal device,
- wherein the transmitting target image data is performed when the received second authentication information matches the stored first authentication information which is associated with the identification information specified by the received specific information.

9. The management server according to claim 1, wherein the transmitting the location information transmits at least one of image data for printing including the location information, a two dimensional code including the location information, and a command to write the location information in a wireless tag.

10. The management server according to claim 1, wherein the computer-readable instructions cause the management server to further perform deleting at least one of the original image data and the identification information when the transmitting target image data is complete.

* * * * *